United States Patent
Dote et al.

(10) Patent No.: US 8,407,363 B2
(45) Date of Patent: *Mar. 26, 2013

(54) GENERATING LOW RESOLUTION USER INTERFACES FOR TRANSMISSION TO MOBILE DEVICES

(75) Inventors: Brian Dote, Waipahu, HI (US);
Stephane Lunati, Fremont, CA (US);
Ken Goto, San Francisco, CA (US);
Seejo Pylappan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/314,092

(22) Filed: Dec. 7, 2011

(65) Prior Publication Data

US 2012/0203924 A1 Aug. 9, 2012

Related U.S. Application Data

(63) Continuation of application No. 11/770,617, filed on Jun. 28, 2007, now Pat. No. 8,161,179.

(51) Int. Cl.
*G06F 15/16* (2006.01)

(52) U.S. Cl. ........ 709/232; 709/246; 709/247; 715/249; 715/815; 345/594; 348/14.12

(58) Field of Classification Search ........................ None
See application file for complete search history.

(56) References Cited

U.S. PATENT DOCUMENTS

| | | | |
|---|---|---|---|
| 5,946,690 A | 8/1999 | Pitts | |
| 7,062,107 B1 * | 6/2006 | Crosby et al. | 382/299 |
| 7,120,593 B1 * | 10/2006 | Fry et al. | 705/27.1 |
| 7,167,703 B2 | 1/2007 | Graham et al. | |
| 7,457,820 B1 * | 11/2008 | Viger et al. | 1/1 |
| 2002/0087622 A1 | 7/2002 | Anderson et al. | |
| 2003/0143979 A1 * | 7/2003 | Suzuki et al. | 455/406 |
| 2004/0080516 A1 | 4/2004 | Kurumisawa et al. | |
| 2004/0093432 A1 * | 5/2004 | Luo et al. | 709/247 |
| 2004/0162804 A1 | 8/2004 | Strittmatter et al. | |
| 2006/0092266 A1 * | 5/2006 | Morgan | 348/14.01 |
| 2006/0109343 A1 * | 5/2006 | Watanabe et al. | 348/79 |
| 2006/0218480 A1 | 9/2006 | Moggert et al. | |
| 2007/0024527 A1 | 2/2007 | Heikkinen et al. | |
| 2007/0118662 A1 | 5/2007 | Vishwananthan et al. | |
| 2009/0172547 A1 | 7/2009 | Sparr | |
| 2009/0313304 A1 | 12/2009 | Goodger et al. | |

OTHER PUBLICATIONS

Hakala et al., "Mobile Photo Browsing with Pipelines and Spatial Cues," Interact 2005, LNCS 3585, pp. 227-239, 2005.
PBase, Cooking by Dave at pbase.com dated Aug. 13, 2003.
PBase, Dave's Photo Galleries at pbase.com dated Dec. 9, 2003.

(Continued)

*Primary Examiner* — Mohamed Ibrahim

(74) *Attorney, Agent, or Firm* — Park, Vaughan, Fleming & Dowler LLP

(57) ABSTRACT

A computer-implemented method includes generating a user interface for displaying one or more images, receiving a request from a remote device to view the user interface, determining whether the remote device is a mobile device communicating over a wireless network, depending on a result of the determination, generating a low resolution version of the user interface that is computationally less intensive to render compared to the previously generated user interface, and transmitting the low resolution version of the user interface to the requesting device.

21 Claims, 4 Drawing Sheets

OTHER PUBLICATIONS

PBase, Images—pbase Help System at pbase.com dated Aug. 5, 2003.
PBase, Time Photo Gallery by Dave at pbase.com dated Dec. 4, 2003.
PBase, Uploading Your Photos—pbase Help System at pbase.com dated Jun. 18, 2003.
PBase, Arnoldas Jurgaitis's Photo Galleries at pbase.com dated Jul. 20, 2006.
Bjork et al., "West: A Web Browser for Small Terminals," dated 1999 ACM.
Bajula, "Browsing on Small Screens; Recasting Web-Page Segmentation into an Efficient Machine Learning Framework," dated May 2006, IW3C2, ACM.
Kaashoek et al., "Dynamic Documents: Mobile Wireless Access to the WWW," dated 1995 IEEE.

* cited by examiner

GENERATING LOW RESOLUTION USER INTERFACES FOR TRANSMISSION TO MOBILE DEVICES

CROSS REFERENCE TO RELATED APPLICATION

This application is a continuation of U.S. patent application Ser. No. 11/770,617, filed Jun. 28, 2007, now U.S. Pat. No. 8,161,179 which is incorporated herein by reference in its entirety.

TECHNICAL FIELD

This disclosure relates to generating low resolution user interfaces for displaying digital images, and transmitting such user interfaces to a mobile device.

BACKGROUND

Mobile devices such as cellular telephones can be connected to storage repositories located at remote network locations via wireless networks, such as cellular telephone data networks or other wireless wide area networks (WWANs). The cellular telephone network providers can enable a user in possession of the mobile device to transmit content to the repository, e.g., as attachments to electronic mail messages and to access the content stored at the repository for viewing, editing, and the like. In addition, the content stored at repositories at network locations can be accessed using devices such as computers that are communicatively connected to the repository via the internet. A user interface displaying the content can be generated and provided to a user at the mobile device with which the user accesses the repositories. User experience, while viewing the user interface, can be enhanced by incorporating features into the user interface using XML, Flash, and the like. Alternatively, or in addition, a HTML version, which tends to be computationally less intensive to render, of the enhanced user interface can be created and used.

SUMMARY

In one example, digital images stored in a repository at a network location can be displayed in a user interface that can be transmitted to devices over a wireless network. When a first request to access the images is received from a mobile device, a low resolution version of the user interface can be generated, stored, and transmitted to the mobile device. When a second request to view the same content is received from the same or different mobile device, the stored, previously generated user interface can be transmitted to the requesting mobile device, instead of re-generating a new low resolution version of the user interface.

In one aspect, a computer-implemented method includes generating a user interface for displaying one or more images, receiving a request from a remote device to view the user interface, determining whether the remote device is a mobile device communicating over a wireless network, and depending on a result of the determination, generating a low resolution version of the user interface that is computationally less intensive to render compared to the previously generated user interface, and transmitting the low resolution version of the user interface to the requesting device.

This, and other aspects, can include one or more of the following features. The method can further include receiving the one or more images from a device configured to transmit the one or more images over the wireless network. The device can be a mobile device. The method can further include capturing an image using the mobile device, compressing the image to generate a low resolution image corresponding to the captured image, wherein the low resolution image occupies less storage space compared to the captured image, and transmitting the low resolution image over the wireless network. The method can further include storing the low resolution version of the user interface, associating a content tag comprising a first content value and a second content value to the one or more images, and associating an interface tag comprising a first interface value and a second interface value to the low resolution version of the user interface. The method can further include updating the first content value upon detecting changes to the one or more images, the changes including at least one of adding images, deleting images, and editing images. The method can further include detecting that a new request to view the user interface is received from a mobile device configured to receive the user interface over the wireless network, upon detecting that the first interface value is not equal to the updated first content value, generating a new low resolution version of the user interface, the new low resolution version including the changes to the one or more images, transmitting the new low resolution version to the mobile device, in response to the new request, updating the second interface value, and updating the second content value. The method can further include detecting that a new request to view the user interface is received from a mobile device configured to receive the user interface over the wireless network, and upon detecting that the first content value equals the first interface value, and that the second content value equals the second interface value, transmitting the stored low resolution version to the mobile device, in response to the new request. The method can further include periodically monitoring the first content value, second value, first tag value, and second tag value, upon detecting that the first content value equals the first tag value, and that the second content value equals the second tag value after a period in time, deleting the stored low resolution version of the user interface, and re-capturing the content tag and the interface tag for associating with a different low resolution user interface. The method can further include generating a first uniform resource locator pointing to the location of the low resolution version of the user interface, transmitting the first uniform resource locator to the mobile device, in response to the request, and upon detecting the selection of the first uniform resource locator, displaying the low resolution version of the user interface. The method can further include receiving the one or more images from the first mobile device over the wireless network, and generating a second uniform resource locator corresponding to each image of the one or more images. The method can further include generating a third uniform resource locator corresponding to the user interface, detecting that the request to view the user interface is received from a device other than a mobile device communicating over a wireless network, and transmitting the third uniform resource locator to the device. The first mobile device can be a cellular telephone and the wireless network can be a cellular telephone network.

In another aspect, a medium bearing instructions to enable one or more machines to perform operations is described. The operations include generating a user interface for displaying one or more images, receiving a request from a remote device to view the user interface, determining whether the remote device is a mobile device communicating over a wireless network, and depending on a result of the determination, generating a low resolution version of the user interface that is computationally less intensive to render compared to the previously generated user interface, and transmitting the low resolution version of the user interface to the requesting device.

This, and other aspects, can include one or more of the following features. The operations can further include receiving the one or more images from a device configured to transmit the one or more images over the wireless network. The device can be a mobile device. The operations can further include capturing an image using the mobile device, compressing the image to generate a low resolution image corresponding to the captured image, wherein the low resolution image occupies less storage space compared to the captured image, and transmitting the low resolution image over the wireless network. The operations can further include storing the low resolution version of the user interface, associating a content tag comprising a first content value and a second content value to the one or more images, and associating an interface tag comprising a first interface value and a second interface value to the low resolution version of the user interface. The operations can further include updating the first content value upon detecting changes to the one or more images, the changes including at least one of adding images, deleting images, and editing images. The operations can further include detecting that a new request to view the user interface is received from a mobile device configured to receive the user interface over the wireless network, upon detecting that the first interface value is not equal to the updated first content value, generating a new low resolution version of the user interface, the new low resolution version including the changes to the one or more images, transmitting the new low resolution version to the mobile device, in response to the new request, updating the second interface value, and updating the second content value. The operations can further include detecting that a new request to view the user interface is received from a mobile device configured to receive the user interface over the wireless network, and upon detecting that the first content value equals the first interface value, and that the second content value equals the second interface value, transmitting the stored low resolution version to the mobile device, in response to the new request. The operations can further include periodically monitoring the first content value, second value, first tag value, and second tag value, upon detecting that the first content value equals the first tag value, and that the second content value equals the second tag value after a period in time, deleting the stored low resolution version of the user interface, and re-capturing the content tag and the interface tag for associating with a different low resolution user interface. The operations can further include generating a first uniform resource locator pointing to the location of the low resolution version of the user interface, transmitting the first uniform resource locator to the mobile device, in response to the request, and upon detecting the selection of the first uniform resource locator, displaying the low resolution version of the user interface. The operations can further include receiving the one or more images from the first mobile device over the wireless network, and generating a second uniform resource locator corresponding to each image of the one or more images. The operations can further include generating a third uniform resource locator corresponding to the user interface, detecting that the request to view the user interface is received from a device other than a mobile device communicating over a wireless network, and transmitting the third uniform resource locator to the device. The first mobile device can be a cellular telephone and the wireless network can be a cellular telephone network.

The system and techniques described here can provide one or more of the following advantages. The processing load on the mobile device required to render a user interface on a display device embedded in the mobile device can be reduced by transmitting a low resolution version of the user interface to the mobile device. In addition, the time lapse between a user's placing a request for the user interface and the user interface being displayed on the mobile device can be reduced, thereby enhancing user experience on the mobile device. Storing the generated low resolution version of the user interface and providing the stored version under appropriate circumstances can further reduce the time lapse between receiving a request for the user interface and displaying the user interface on the mobile device. Further, processing power required to generate a new low resolution version of the user interface for each new request for the user interface from a mobile device can be decreased.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

Figure 1:
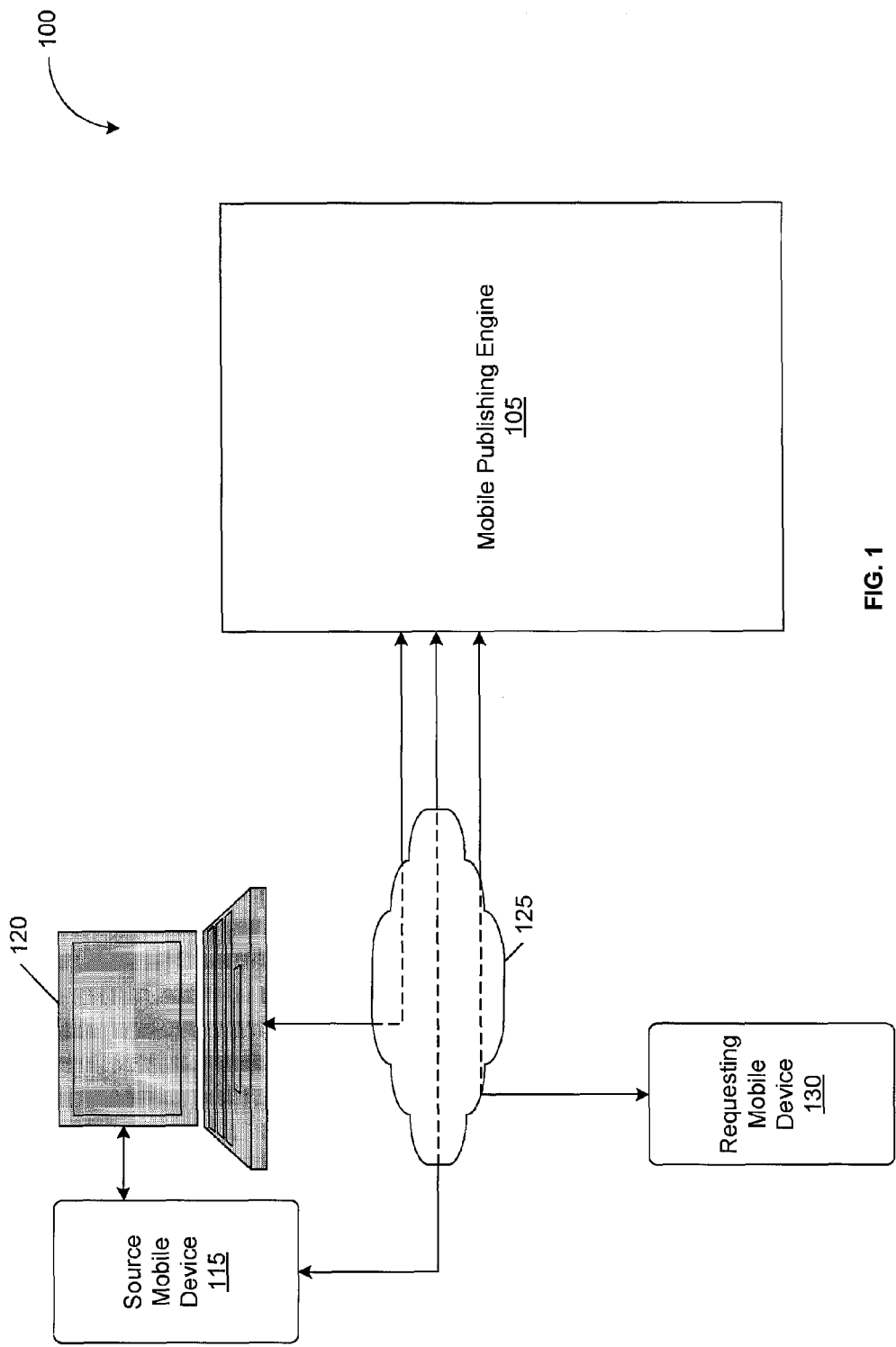
FIG. 1 shows an example of a system for receiving and transmitting images over a network.

FIG. 1 depicts a schematic of an example of a system 100 for receiving content from one or more devices and for enabling devices to access the received content. The system 100 can include a mobile publishing engine (MPE) 105 located at a network location and configured to receive and store content including digital content such as digital images, digital video, audio, documents, and the like, from one or more sources including a source mobile device 115, a computer 120, and the like over a network 125. The computer 120 can be virtually any computer such as desktop computer, laptop computer, personal digital assistant (PDA), and the like. The source mobile device 115 and the computer 120 can be operatively coupled to the MPE 105 over a network 125. In some implementations, the network can be the internet and the computer 120 can interact with the MPE 105 via protocols such as transmission control protocol/internet protocol (TCP/IP). In other implementations, the network 125 can be, e.g., a 3G cellular telephone data network, where the network service provider can enable accessing the MPE 105 over the network 125 using the source mobile device 115. In some implementations, one device can be connected to the MPE 105 via the internet while another device can be connected to the MPE 105 via a cellular telephone network. In some implementations, messages such as electronic mail messages, can be sent from the source mobile device 115 to the MPE 105 and vice versa, via protocols such as simple mail transfer protocol (SMTP), where the messages can include content as attachments. The MPE 105 can be configured to receive content from any number of mobile devices and/or any number of computers. Further, in some implementations, the system 100 can receive requests from various devices, including a requesting mobile device 130 which can request access to the content stored on the MPE 105. The requesting mobile device 130 can also be operatively coupled to the MPE 105 via the network 125. In some implementations, the source mobile device 115 and the requesting mobile device 130 can be the same mobile device. The mobile devices in system 100 can include devices such as cellular telephones, digital cameras, digital camcorders, and the like, which can include features that enable the mobile device to interact with the MPE 105 over a network, as well as to capture digital content.

The MPE 105 can receive digital content, e.g., digital images, from a source mobile device 115 used to capture the images or from a computer 120 or both. The MPE 105 can store the images in one or more containers, where a container can represent an album. Further, the MPE 105 can be configured to provide a user interface (UI) displaying the one or more containers and enabling a user to access the images by interacting with the one or more containers on the UI. For example, the UI can display each container as a rectangular frame, where the frames can be arranged in rows. In this manner, images in containers can be displayed as a photo gallery in a UI. A user can access the images in each container by selecting a corresponding frame, e.g., by clicking on the frame with a pointer controlled by a pointing device, e.g., a mouse. Depending on the features of the source mobile device 115 or a camera that was used to capture the images, the file size of the captured images can be large, e.g., in megabytes (MB). Further, the UI can include content created using tools such as extensible markup language (XML) and Flash, that can cause the UI to be computationally intensive to render. When the MPE 105 receives a request from a device, e.g., a computer operatively coupled to the MPE 105 via the network over a high bandwidth connection, to view the images, the MPE 105 can be configured to display the UI with the frames on a display device operatively coupled to the requesting device.

If the request is received from the receiving mobile device 130, e.g., a cellular telephone, where transmitting and rendering the UI can be time exhaustive, rather than transmitting the computationally intensive version of the UI to the requesting mobile device 130, the MPE 105 can be configured to generate a low resolution, less computationally intensive version of the UI, e.g., using hyper text markup language (HTML), and transmit the low resolution version to the receiving mobile device 130. Subsequently, the MPE 105 can store the low resolution version. When a second request for the same content is received from a second requesting mobile device 130, the MPE 105 can check the repository for any updates to the images, and, in the absence of updates, can provide the stored low resolution version to the second requesting mobile device 130. If the repository has been updated, then the MPE 105 can generate a new low resolution version of the UI, transmit the new low resolution version to the UI, and store the new version.

Figure 2:
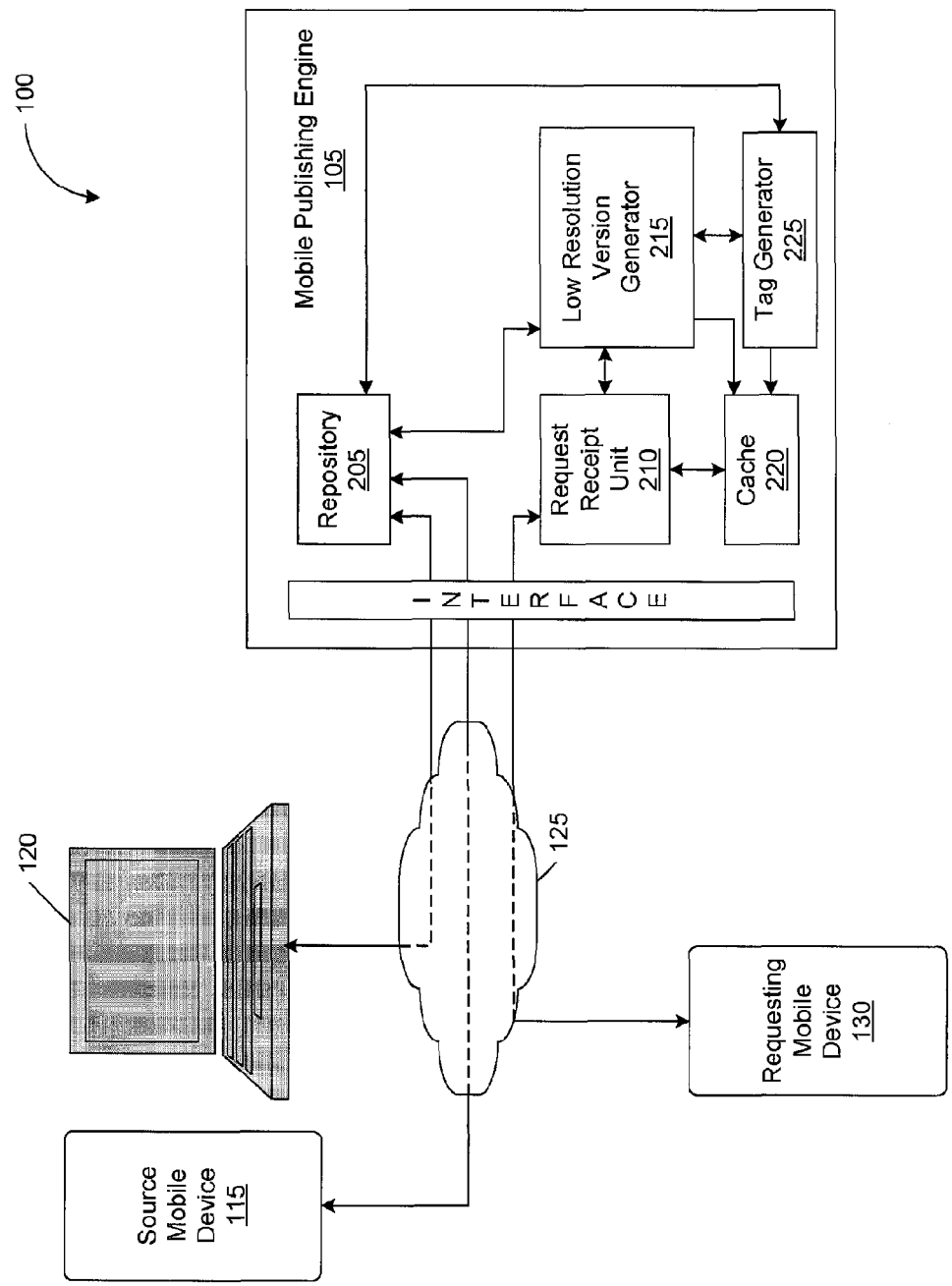
FIG. 2 shows an example of a system including a mobile publishing engine for processing requests for content stored on the engine.

FIG. 2 depicts a schematic of the MPE 105 in the system 100 for receiving content from and transmitting a user interface displaying the content to one or more devices. In some implementations, the user of a device, such as the source mobile device 115, the computer 120, and the requesting mobile device 130, can interact with the MPE 105 over the network 125 through an interface at a web page of a web site. For example, the MPE 105 can present the user of the device with a uniform resource locator (URL), such as www.mpe-.com, which the user can enter into a web browser. The MPE 105 can present the user with a web page using which the user can perform one or more operations on the MPE 105 including creating an account on the MPE 105, accessing an existing account, and the like. When the user creates an account on the MPE 105, the MPE 105 can allocate a repository 205 to the user, which serves as storage space for the user to store the digital images. In implementations where the user accesses the MPE 105 to transmit images from the computer 120 to the repository 205, the MPE 105 can be configured to search all storage devices operatively coupled to the computer 120 for images and display the images in the UI. Alternatively, the user can upload one or more images from storage devices operatively coupled to the computer 120.

In some implementations, the MPE 105 can create a UI to display the images transmitted to the repository 205 by a user. Each image can be displayed on the UI as a rectangular frame and the frames can be arranged in rows. When the user views the UI on the computer 120, the MPE 105 can be configured to display all the uploaded images and enable the user to store the uploaded images in a corresponding container. The user can create one or more containers, store one or more images in a container, and further display the containers in the UI, where each container can be represented by a corresponding frame. In this manner, the UI presented to a device by the MPE 105 can display one or more containers of images to a user at a remote location, and enable the user to access the images in each container for operations including viewing, editing, and the like. A user can transmit images to the repository 205 from the source mobile device 115, from the computer 120, or both. In some implementations, when an image is received, the MPE 105 can store the image in the repository 205 and create a unique identifier, e.g., a URL, that points to the image. The MPE 105 can assign an identifier for each image and also assign an identifier, e.g., a URL, to each container in which images are stored. Further, the MPE 105 can generate an identifier such as a URL for the UI corresponding to a user. The MPE 105 can receive requests to access the images from a user through one or more devices, and, in response to the requests, the MPE 105 can transmit the identifier that enables access to one or all of the UI, the containers, and the images to the requesting device. For example, the request can be received from the user who transmitted the images to the repository. Alternatively, or in addition, the request can be received from a different user who is in possession of the identifier that points to all the containers in the repository 205. When the identifier is entered in a web browser, e.g., Safari, the UI where all the containers containing all the images are displayed can be displayed on the web browser. A user can navigate the UI to access the images in the containers using a pointing device, e.g., a mouse.

In order to provide a good user experience, the MPE 105 can be configured to generate the UI using XML, Flash, and the like, and include animations, images, and the like, in the UI. However, in the absence of adequate processing capability, such a UI including large file size, high resolution digital images, can be computationally intensive to render. In some implementations, the MPE 105 can include a request receipt unit (RRU) 210 that can be configured to receive requests to view the images from devices including a source mobile device, a computer, a requesting mobile device 130, and the like. Further, the RRU 210 can be configured to detect if the request is received from a mobile device, such as a requesting mobile device 130. If the requesting mobile device 130 does not possess sufficient processing capability to render the computationally intensive UI, the MPE 105 can generate a low resolution version of the UI for transmission to the requesting mobile device 130. In some implementations, the MPE 105 can include a low resolution version (LRV) generator 215 configured to generate a low resolution version, e.g., version created using HTML, of the UI for transmission to the requesting mobile device 130. When the RRU 210 detects that the request to access the images in the repository 205 is received from a requesting mobile device 130, the RRU 215 can request the LRV generator 215 to generate a low resolution version of the UI for transmission to the requesting mobile device 130. In some implementations, the LRV generator 215 can use Java image processing techniques to generate a low resolution version of the UI, as well as to generate low resolution versions of the images in the repository 205. While the full resolution versions of the images can occupy megabytes of storage space, the low resolution versions of the images can occupy only a few kilobytes.

The MPE 105 can identify that the request for images is from a mobile device. In response, the MPE 105 can generate an identifier that points to the low resolution version of the images in the content repository 205. In some implementations, the identifier, e.g., a URL, can be represented as follows:

http://host/username/container/image.ext?derivative=FORMAT&src=ImageSource.ext&type=ETRAINFO In the above identifier, "derivative" can represent the low resolution version of an image. If the low resolution version of the image exists, then the LRV generator 215 can retrieve the previously created low resolution image for inclusion in the low resolution version of the UI. If the MPE 105 determines that such a low resolution version of the image does not exist, the MPE 105 can create a low resolution version of the image and the LRV generator 215 can include the newly created low resolution version of the image in the low resolution version of the UI. The low resolution version of the UI can display at least one of a list of containers containing images, metadata related to each container, e.g., number of images, container size, and the like, image details, identifiers that can be used to retrieve the images, and the like. For example, in the list of containers containing images UI, each image can be displayed as a thumbnail, while in the image details UI, a larger thumbnail image can be used depending on an image ratio, e.g., portrait/landscape. The MPE 105 can be configured to generate different versions of images, in addition to low resolution versions of images. For example, the MPE 105 can be configured to generate a reflection image that corresponds to an image. The reflection image can be displayed under the original image to provide a visual effect and improve user experience. In addition, the MPE 105 can also be configured to manipulate one or more types of video files. The MPE 105 can transmit the low resolution versions of the UI to the requesting mobile device 130.

In addition, the MPE 105 can be configured to store the low resolution version of the UI generated by the LRV generator 215 in a cache 220. In some implementations, the MPE 105 can include a tag generator 225 that can generate tags, including a first value when images are stored in the repository 205 and a second value when the LRV generator 215 creates a low resolution version of the UI for transmission to a requesting mobile device 130. The first value and second value can be separate entities or part of the same tag. When the MPE 105 receives one or more images to be stored in the repository 205, the tag generator 225 can generate and store the first value. For each instance when the repository 205 is updated, e.g., by adding new images, editing existing images, deleting existing images, and the like, a new first value can be generated and the old first value can be over-written with the new first value. In implementations where the first and second values are included in a single tag, the MPE 105 can update the portion of the tag representing the first value when the MPE 205 detects a change to the repository 205. Further, the MPE 105 can associate a default second value to the tag when images are stored in the repository 205. The default second value is an indicator that no request for access to the content in the repository 205 has been received from a mobile device and, therefore, no low resolution version of the UI has been generated by the LRV generator 215. When the MPE 105 receives a request for access from a requesting mobile device 130, the tag generator 225 can generate the second value, associate the second value with the low resolution version generated by the LRV generator 215, and store the second value. The tag generator 225 can generate a new second value for each instance when a low resolution version of a UI is generated and can replace the old second value with the new second value. Also, in implementations where the first value and second value are included in the same tag, the portion of the tag representing the second value can be updated when a new low resolution version of the UI is generated. If the low resolution version is generated for the first time, then the MPE 105 can replace the default second value with the new second value.

When the repository 205 detects a change in the stored images, the repository 205 can generate a first value. When the RRU 210 receives a request to access images in the repository 205 from a requesting mobile device 130, the MPE 105 can scan cache 220 to detect if a low resolution version of the UI is available. Alternatively, the MPE 105 can check if the second value in the tag matches the default second value indicating that no low resolution version of the UI was created. If a low resolution version is not available, the MPE 105 can prompt LRV generator 215 to generate such a version. The LRV generator 215 can pull the images from the repository 205 to generate the low resolution version of the UI or the repository 205 can push the images to the LRV generator 215. The LRV generator 215 can generate a low resolution version of the UI, transmit the low resolution version to the requesting mobile device 130, and transmit the low resolution version to cache 220 for storage. The tag generator 225 can generate a new second value to represent the stored low resolution version of the UI, and overwrite the default second value. In addition, the MPE 105 can also associate the tag, including the first and second values, with the low resolution version of the UI.

If a low resolution version is available in cache 220, the MPE 105 can retrieve the tag associated with the low resolution version in cache 220, and compare the retrieved tag with the current tag. If no changes have been made to the repository 205, then the current and retrieved tags will match, and the low resolution version from cache 220 can be retrieved and transmitted to the requesting mobile device 130. If changes to the repository 205 have been made since the last instance of generating a low resolution version of the UI, then the first value of the retrieved tag will differ from that of the current tag. In such instances, the LRV generator 225 can generate a new low resolution version of the UI, the tag generator 225 can generate a new second value to update and store the tag and associate the tag with the new low resolution version of the UI, and the new low resolution version can be sent to the requesting mobile device 130. In this manner, generation of a low resolution version of the UI can be monitored and performed only in instances where the images in the repository have been updated.

Figure 3:
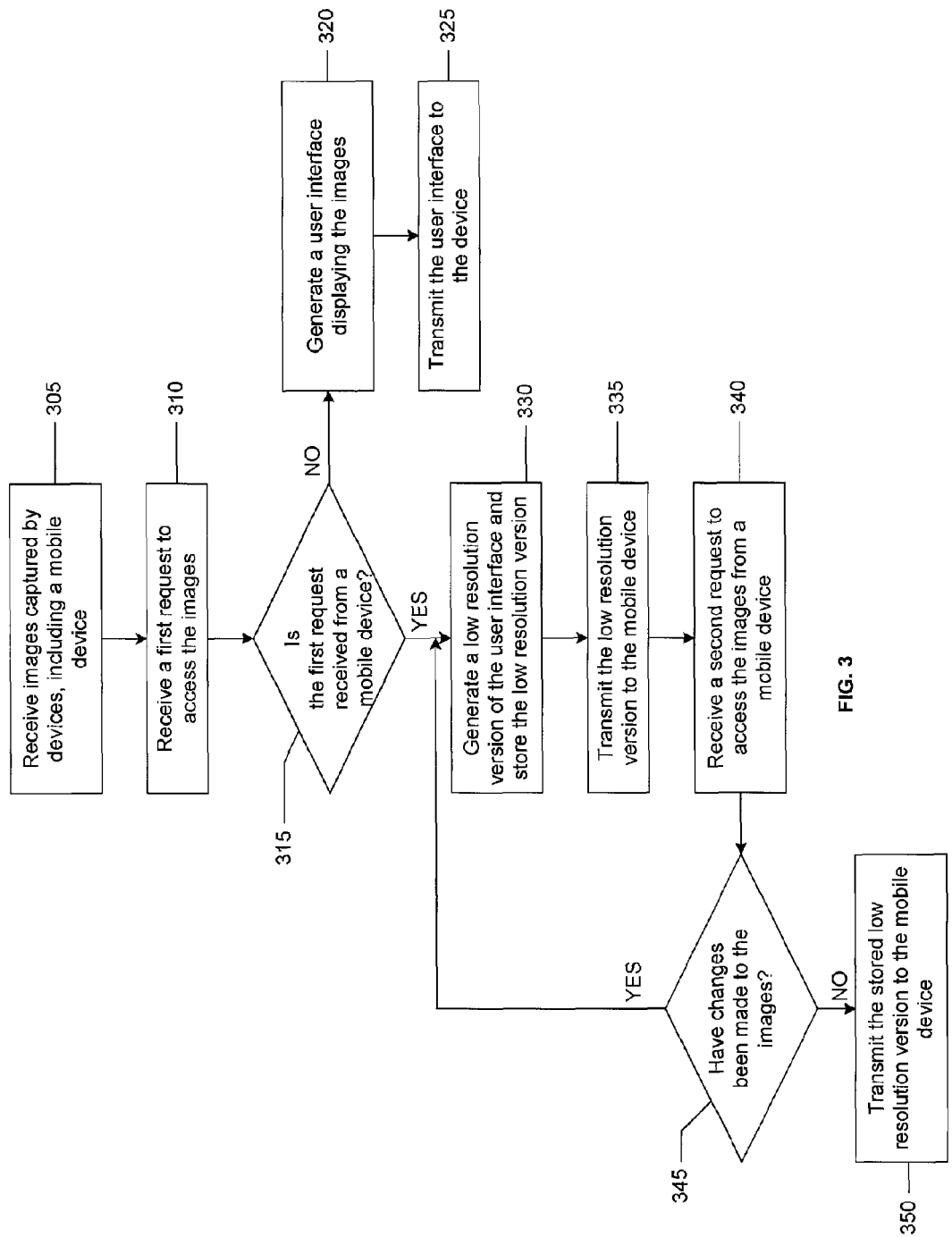
FIG. 3 is a flow chart of an example of a process for transmitting a user interface displaying images to a device.

FIG. 3 depicts a flow chart of an example of a process for transmitting a UI displaying one or more images to a device in response to a request from the device. The one or more images can be received from a device, including a mobile device at 305. The images can be received over a network, where the network can be the internet, a cellular telephone network, and the like. The device used to capture the images can be a digital camera, a cellular telephone embedded with a digital camera, and the like. In some implementations, the cellular telephone can transmit images captured using the cellular telephone over the cellular telephone network. In other implementations, the device used to capture the images can be operatively coupled to a computer connected to the internet. The images can be transferred from the device to the computer and received from the computer. The received images can be stored in a repository and access to the images can be enabled by presenting a user interface at a network location, e.g., a web page of a web site that can be identified by a URL.

A first request to access the images can be received at 310. The first request can be received from a user who wishes to view and/or edit the images. The images may have been received from the user requesting access. Alternatively, the user who transmitted the images can enable sharing the images by providing the identifier that enables access to the images to one or more other users. Requests to access the images can be received from devices such as a computer connected to the repository via the internet, a mobile device, e.g., a cellular telephone, connected to the repository via the cellular telephone network, and the like. In response to the requests, the images in the repository can be displayed in a UI as one or more rows of one or more rectangular frames, where a frame can represent an image. In addition, the images can be grouped into containers and each container can be represented by a corresponding frame. The UI can be generated using XML, Flash, and the like, to provide a good user experience. A user can interact with the UI using a cursor operated by a pointing device, e.g., a mouse, a key board, a stylus, on a touch screen using the user's finger, on a near-touch screen, and the like.

A check can be performed to determine if the first request is received from a mobile device at 315. If the first request is not received from a mobile device and, instead, is received from a device operatively coupled to the repository through strong network connection, e.g., a high bandwidth network connection, then the UI displaying the images can be generated at 320 and transmitted to the device at 325. If the first request is received from a mobile device, then factors including the strength of the connection between the mobile device and the repository, the processing capability of the mobile device, and the like, can cause transmission of the images and rendering of the UI on the mobile device to be time exhaustive providing a bad user experience. In such instances, a low resolution version of the UI, e.g., a HTML version of the computationally exhaustive XML/Flash version, can be generated and stored at 330, and the low resolution version can be transmitted to the mobile device at 335. A user accessing the images can view the images, and, in some instances, perform operations such as add, delete, edit, and the like, to the images.

A second request to access the images in the repository can be received from a mobile device at 340. A check can be performed to determine if changes have been made to the images in the repository at 345. If no changes have been made, then the stored low resolution version of the UI can be transmitted to the mobile device from which the second request was received at 350. If changes to the images in the repository were made, then a new low resolution version of the UI can be generated, stored, and transmitted to the mobile device. In some implementations, the second request can be received from a device that is not a mobile device, e.g., a computer operatively coupled to the repository over the internet. In such implementations, if no changes have been made to the images in the repository, then the computationally intensive version of the UI can be transmitted to the device. If changes have been made to the images, then a new UI can be generated, stored, and transmitted to the device.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, in implementations where the images were received from a source mobile device for storage in the repository 205, the MPE 105 can generate a new low resolution version of the UI to display images when the source mobile device 115 is operatively coupled to a computer 120 which is, in turn, operatively coupled to the MPE 105 over the network 125.

Figure 4:
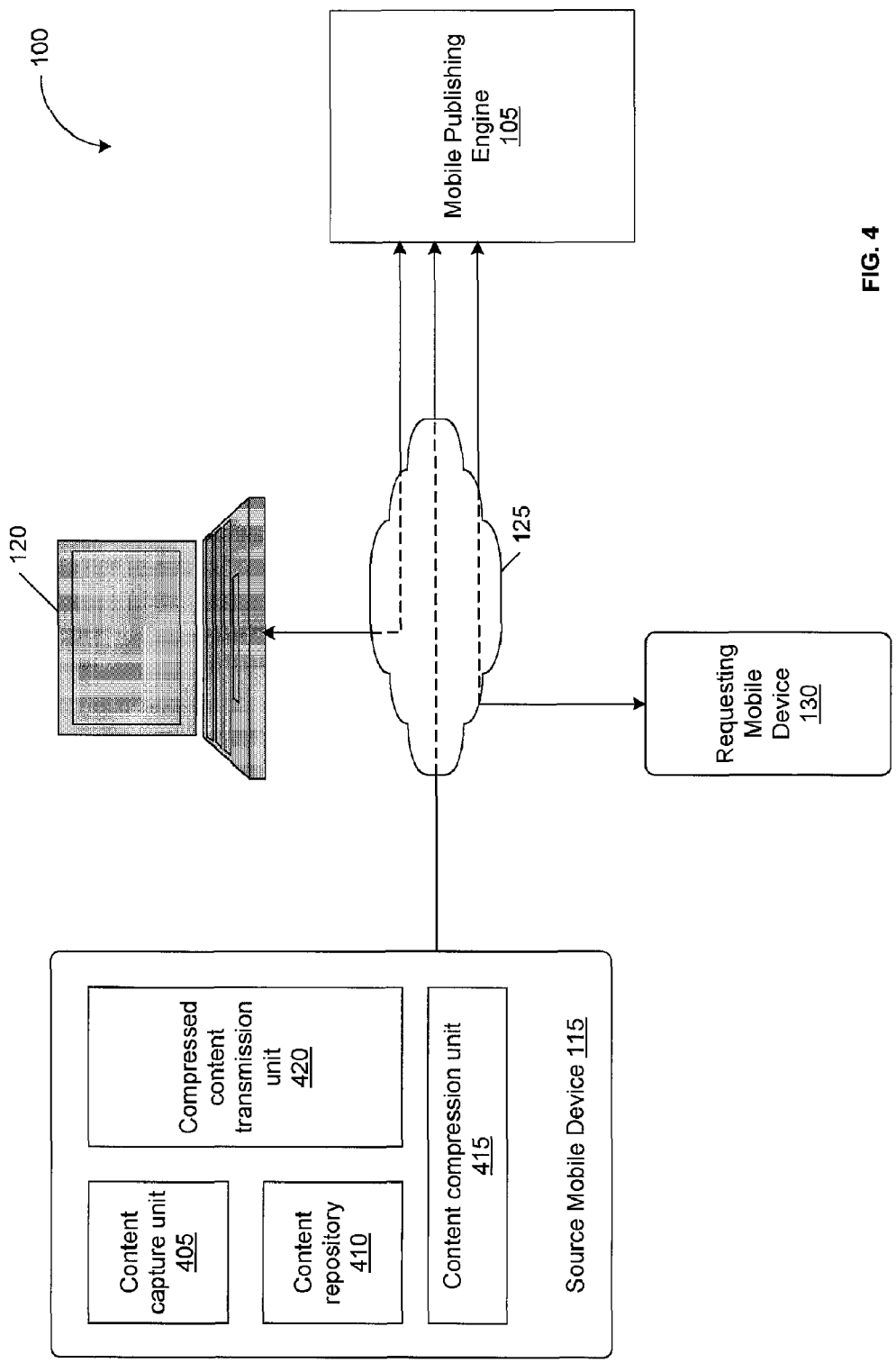
FIG. 4 shows an example of a mobile device for transmitting content to a repository.

FIG. 4 depicts a schematic of an example of a source mobile device 115 operatively coupled to the MPE 105. The source mobile device 115 can include a content capture unit 405, e.g., the digital image capturing features incorporated in a cellular telephone. The captured content, e.g., digital images can be stored in a content repository 410. For example, the source mobile device 115 can be a cellular telephone with digital camera features capable of capturing 3 megapixel images. Each 3 megapixel image can occupy at least a few megabytes of storage space. The content repository 410 can include sufficient storage space to store multiple images captured using the source mobile device 115. The source mobile device 115 can be configured to enable a user to create a message, such as an e-mail message, to which the user can attach the one or more images as attachments. Further, the source mobile device 115 can be configured to transmit the message including the attachments to the MPE 105 over the network 125, e.g., a cellular telephone network, for storage. Since each image captured by the source mobile device is large in size, transmission to the MPE 105 may take an extended period of time or may not be feasible. Therefore, the source mobile device 115 can include a content compression unit 415 configured to generate low resolution image versions of the large size image, where each low resolution image can occupy a few kilobytes of storage space. The content compression unit 415 can compress each image captured by the content capture unit 405 and store the compressed image in the content repository 410. In some implementations, the content compression unit 415 can compress each image using any compression software. The source mobile device 115 can also include a compressed content transmission unit 420 which, in response to input from a user to transmit a message including attachments to the MPE 105, can create an e-mail message body, enable attaching the low resolution images, and can transmit the message to the MPE 105. Subsequently, the user can connect the source mobile device 115 to a computer 120 to, e.g., download the images from the source mobile device 120 to a storage device operatively coupled to the computer 120. In such implementations, when the computer 120 is connected to the MPE 105, the MPE 105 can be configured to detect that the source mobile device 115 is operatively coupled to the computer 120, to pull the full size image files from the source mobile device 115, and update the low resolution images in the MPE 105 with the full size images. This transmission of full size image files from the source image device 115 to the MPE 105 through the computer 120 can be facilitated by a high bandwidth network connection between the computer 120 and the MPE 105.

Thus, when images are transmitted from the source image file 115 to the MPE 115, corresponding low resolution images are created in the source mobile device 115, transferred to and stored in the MPE 105. When the source mobile device 115 is operatively coupled to a computer 120 which, in turn, is operatively coupled to the MPE 105 through a high bandwidth connection, then the full size images are transferred from the source mobile device 115 to the MPE 105. In some implementations, the MPE 105 can over-write the low resolution images. In other implementations, the MPE 105 can store both versions of the same image. Since the images in the repository 205 are updated depending upon the method in which the source mobile device 115 is connected to the MPE 105, a new first value is generated for each updating of the repository causing a change in the tag value. This change in tag value causes the MPE 105 to generate a new low resolution version of the UI.

In some implementations, the MPE 105 can create and associate a corresponding identifier, such as a URL, with a low resolution version and a full version of a UI. Depending on the source of the request, the MPE 105 can transmit one of the URLs to the requesting device to view the UI on a display device. In some implementations, a user can access a specific image in the repository 205 based on an identifier, such as a URL, corresponding to the image. The MPE 105 can create and associate a corresponding URL, with a low resolution version and high resolution version of the same image. Depending on the source of the request, the MPE 105 can transmit one of the URLs to the requesting device to view the image. In some implementations, the MPE 105 can be configured to detect the strength of the connection, e.g., the bandwidth, between the MPE 105 and the requesting device, and select a URL for a UI or image or both, depending on the strength of the connection.

In some implementations, digital video can be captured using the source mobile device 115 and transmitted to the MPE 105 for storage in addition to one or more images. When a UI displaying a gallery of content is generated, the UI can display each album of containers as rectangular frames arranged in one or more rows. In addition, the UI can display the digital video, stored as a sequence of frames, also as a rectangular frame. The MPE 105 can be configured to identify a frame in the sequence of frames of the digital video, and display the identified frame within the frame representing the digital video. In some implementations, the MPE 105 can also be configured to scan a frame in the digital video, determine the size of the frame (e.g., in kilobytes), and, if the size of the frame is less than a threshold size, deem the frame as unsuitable to be the representative frame, e.g., because the frame may be blank. In such implementations, the MPE 105 can be configured to skip a number of frames that correspond to a duration in the digital video, e.g., 1 second, and repeat the frame analysis process, e.g., scanning to determine frame size, until a suitable representative frame is identified. Subsequently, the MPE 105 can display the identified representative frame in the UI.

In some implementations, the cache can be distributed over multiple servers on different machines, where each cache corresponds to a known quantity of memory space. In some implementations, the MPE 105 can be configured to monitor the cache to determine a duration for which a low resolution version of the UI, stored in cache, is unaltered. For example, when a user creates and shares an album represented by a container in the repository, a number of requests from computers 120 and/or mobile devices can be received to access the album. After creating a low resolution version of the UI in response to the first request from a mobile device, the MPE 105 can store the low resolution version in cache. Subsequent modifications to the album by one or more users can result in new low resolution versions being generated and, consequently, new tags being created. After certain time, e.g., 1 week, the MPE 105 may receive no requests to access the album. In such instances, the low resolution version of the UI in cache can be deleted to create more space for storing other low resolution versions of the UI. A time threshold, e.g., in hours, days, weeks, and the like, can be configured into the MPE 105. After waiting for the time threshold, the MPE 105 can check the tag values for low versions of the UI stored in cache and compare the tag values with the tag values of the repository 205. If the MPE 105 detects no change in the tag values, then it can be deemed that access to the low resolution versions of the UI has ceased. The low resolution version of the UI can be deleted and the tag can be re-captured.

In some implementations, the MPE 105 can check cache to track requests for the low resolution versions of UIs. Further, based on the tracking, the MPE 105 can be configured to retain low resolution versions of UIs that are frequently requested for viewing. Based on the frequency of requests for viewing, the MPE 105 can organize the low resolution versions of the UI in cache. Thus, UIs that are not frequently requested are automatically deleted when the cache is filled with more frequently requested UIs. In this manner, the cache performance can be optimized without active monitoring by the MPE 105. Accordingly, other implementations are within the scope of the following claims.

What is claimed is:

1. A computer-implemented method, comprising:
    storing, at a computing device, a plurality of content items, wherein content items are stored individually and in containers, wherein a container is capable of storing a group of content items, and wherein content items are accessed using a graphical interface on a requesting device;
    receiving a request to access a content item, wherein the request is from a device;
    determining how the content item is stored;
    determining the type of requesting device;
    generating a graphical interface according to the type of requesting device, the graphical interface comprising one or more rows of one or more rectangular frames, each frame displaying a graphical element representing a content item or a container, wherein when the requesting device type is a mobile device, a low resolution version of the graphical interface is generated, wherein the low resolution version of the graphical interface is a less computationally intensive version of the graphical interface;
    generating a unique identifier corresponding to the content item storage and the requesting device type, wherein an item identifier corresponding to a low resolution version of a content item is generated when the content item is individually stored and the requesting device type is a mobile device, and wherein a container identifier corresponding to a low resolution version of a container storing the content item is generated when the content item is stored in a container and the requesting device is a mobile device; and transmitting the content item and the corresponding unique identifier to the requesting device, wherein a unique identifier corresponding to a low resolution version of the content item is transmitted when the requesting device is a mobile device.

2. The method of claim 1, wherein content items includes images, video, audio, and documents.

3. The method of claim 1, further comprising:
generating a new version of the content item and generating a unique identifier corresponding to the new version of the content item.

4. The method of claim 1, further comprising:
transmitting the content item when subsequent requests to access the content item include the corresponding unique identifier.

5. The method of claim 1, wherein the plurality of content items are associated with an account.

6. The method of claim 1, wherein when the content item is video, a representative frame is determined.

7. The method of claim 1, further comprising:
determining that the content item is stored in a container; and
visually associating the content item with the container storing the content item, wherein the visual representation includes a display of the content item or an icon representing the content item.

8. A system, comprising:
one or more processors;
a non-transitory computer-readable memory containing instructions to cause the one or more processors to perform operations, including:
storing a plurality of content items, wherein content items are stored individually and in containers, wherein a container is capable of storing a group of content items, and wherein content items are accessed using a graphical interface on a requesting device;
receiving a request to access a content item, wherein the request is from a device;
determining how the content item is stored;
determining the type of requesting device;
generating a graphical interface according to the type of requesting device, the graphical interface comprising one or more rows of one or more rectangular frames, each frame displaying a graphical element representing a content item or a container, wherein when the requesting device type is a mobile device, a low resolution version of the graphical interface is generated, wherein the low resolution version of the graphical interface is a less computationally intensive version of the graphical interface;
generating a unique identifier corresponding to the content item storage and the requesting device type, wherein an item identifier corresponding to a low resolution version of a content item is generated when the content item is individually stored and the requesting device type is a mobile device, and wherein a container identifier corresponding to a low resolution version of a container storing the content item is generated when the content item is stored in a container and the requesting device is a mobile device; and
transmitting the content item and the corresponding unique identifier to the requesting device, wherein a unique identifier corresponding to a low resolution version of the content item is transmitted when the requesting device is a mobile device.

9. The system of claim 8, wherein content items includes images, video, audio, and documents.

10. The system of claim 8, further comprising instructions to cause the one or more processors to perform operations, including:
generating a new version of the content item and generating a unique identifier corresponding to the new version of the content item.

11. The system of claim 8, further comprising instructions to cause the one or more processors to perform operations, including:
transmitting the content item when subsequent requests to access the content item include the corresponding unique identifier.

12. The system of claim 8, wherein the plurality of content items are associated with an account.

13. The system of claim 8, wherein when the content item is video, a representative frame is determined.

14. The system of claim 8, further comprising instructions to cause the one or more processors to perform operations, including:
determining that the content item is stored in a container; and
visually associating the content item with the container storing the content item, wherein the visual representation includes a display of the content item or an icon representing the content item.

15. A computer-program product, tangibly embodied in a non-transitory machine-readable storage medium, including instructions configured to cause a data processing apparatus to:
store a plurality of content items, wherein content items are stored individually and in containers, wherein a container stores a group of content items, and wherein content items are accessed using a graphical interface on a requesting device;
receive a request to access a content item, wherein the request is from a device;
determine how the content item is stored;
determine the type of requesting device;
generating a graphical interface according to the type of requesting device, the graphical interface comprising one or more rows of one or more rectangular frames, each frame displaying a graphical element representing a content item or a container, wherein when the requesting device type is a mobile device, a low resolution version of the graphical interface is generated, wherein the low resolution version of the graphical interface is a less computationally intensive version of the graphical interface;
generate a unique identifier corresponding to the content item storage and the requesting device type, wherein an item identifier corresponding to a low resolution version of a content item is generated when the content item is individually stored and the requesting device type is a mobile device, and wherein a container identifier corresponding to a low resolution version of a container storing the content item is generated when the content item is stored in a container and the requesting device is a mobile device; and
transmit the content item and the corresponding unique identifier to the requesting device, wherein a unique identifier corresponding to a low resolution version of the content item is transmitted when the requesting device is a mobile device.

16. The computer-program product of claim 15, wherein content items includes images, video, audio, and documents.

17. The computer-program product of claim 15, further comprising instructions configured to cause a data processing apparatus to:
generate a new version of the content item and generating a unique identifier corresponding to the new version of the content item.

18. The computer-program product of claim 15, further comprising instructions configured to cause a data processing apparatus to:
transmit the content item when subsequent requests to access the content item include the corresponding unique identifier.

19. The computer-program product of claim 15, wherein the plurality of content items are associated with an account.

20. The computer-program product of claim 15, wherein when the content item is video, a representative frame is determined.

21. The computer-program product of claim 15, further comprising instructions configured to cause a data processing apparatus to:
determine that the content item is stored in a container; and
visually associate the content item with the container storing the content item, wherein the visual representation includes a display of the content item or an icon representing the content item.

* * * * *